United States Patent
Toyoda et al.

(10) Patent No.: US 10,531,045 B2
(45) Date of Patent: Jan. 7, 2020

(54) RECORDING MEDIUM ON WHICH USER ASSISTANCE PROGRAM IS RECORDED, INFORMATION PROCESSING DEVICE, AND USER ASSISTANCE METHOD

(71) Applicant: FUJITSU LIMITED, Kawasaki-shi, Kanagawa (JP)

(72) Inventors: Yuushi Toyoda, Kawasaki (JP); Koichiro Niinuma, Kawasaki (JP); Ryosuke Kawamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/293,482

(22) Filed: Mar. 5, 2019

(65) Prior Publication Data
US 2019/0320139 A1   Oct. 17, 2019

(30) Foreign Application Priority Data
Apr. 12, 2018 (JP) .................................. 2018-076683

(51) Int. Cl.
| | | |
|---|---|---|
| H04N 7/14 | (2006.01) | |
| H04N 7/15 | (2006.01) | |
| G06F 9/451 | (2018.01) | |

(52) U.S. Cl.
CPC .............. *H04N 7/15* (2013.01); *G06F 9/453* (2018.02)

(58) Field of Classification Search
CPC ...................................................... H04N 7/14
See application file for complete search history.

(56) References Cited

U.S. PATENT DOCUMENTS

| | | | | |
|---|---|---|---|---|
| 7,768,543 | B2 * | 8/2010 | Christiansen | ..... H04L 29/06027 348/14.08 |
| 2005/0154637 | A1 | 7/2005 | Nair et al. | |
| 2008/0255847 | A1 | 10/2008 | Moriwaki et al. | |
| 2013/0290434 | A1 * | 10/2013 | Bank | ..................... G06Q 10/10 709/206 |
| 2014/0368604 | A1 * | 12/2014 | Lalonde | ................. H04N 7/147 348/14.08 |
| 2016/0073054 | A1 * | 3/2016 | Balasaygun | ............. H04N 7/15 348/14.08 |

FOREIGN PATENT DOCUMENTS

| | | |
|---|---|---|
| JP | 2004-272529 | 9/2004 |
| JP | 2005-198303 | 7/2005 |
| JP | 2008-262046 | 10/2008 |
| JP | 2010-141843 | 6/2010 |

\* cited by examiner

*Primary Examiner* — Olisa Anwah
(74) *Attorney, Agent, or Firm* — Fujitsu Patent Center

(57) ABSTRACT

A recording medium on which a user assistance program is recorded which makes a computer perform: based on image information obtained by photographing a plurality of users who use a given service, calculating state quantities of the plurality of respective users corresponding to the image information; counting, for each time period, a number of users whose amounts of change in the calculated respective state quantities are equal to or more than a given threshold value among the plurality of users; and detecting a time period in which the counted number of users satisfies a given condition.

12 Claims, 14 Drawing Sheets

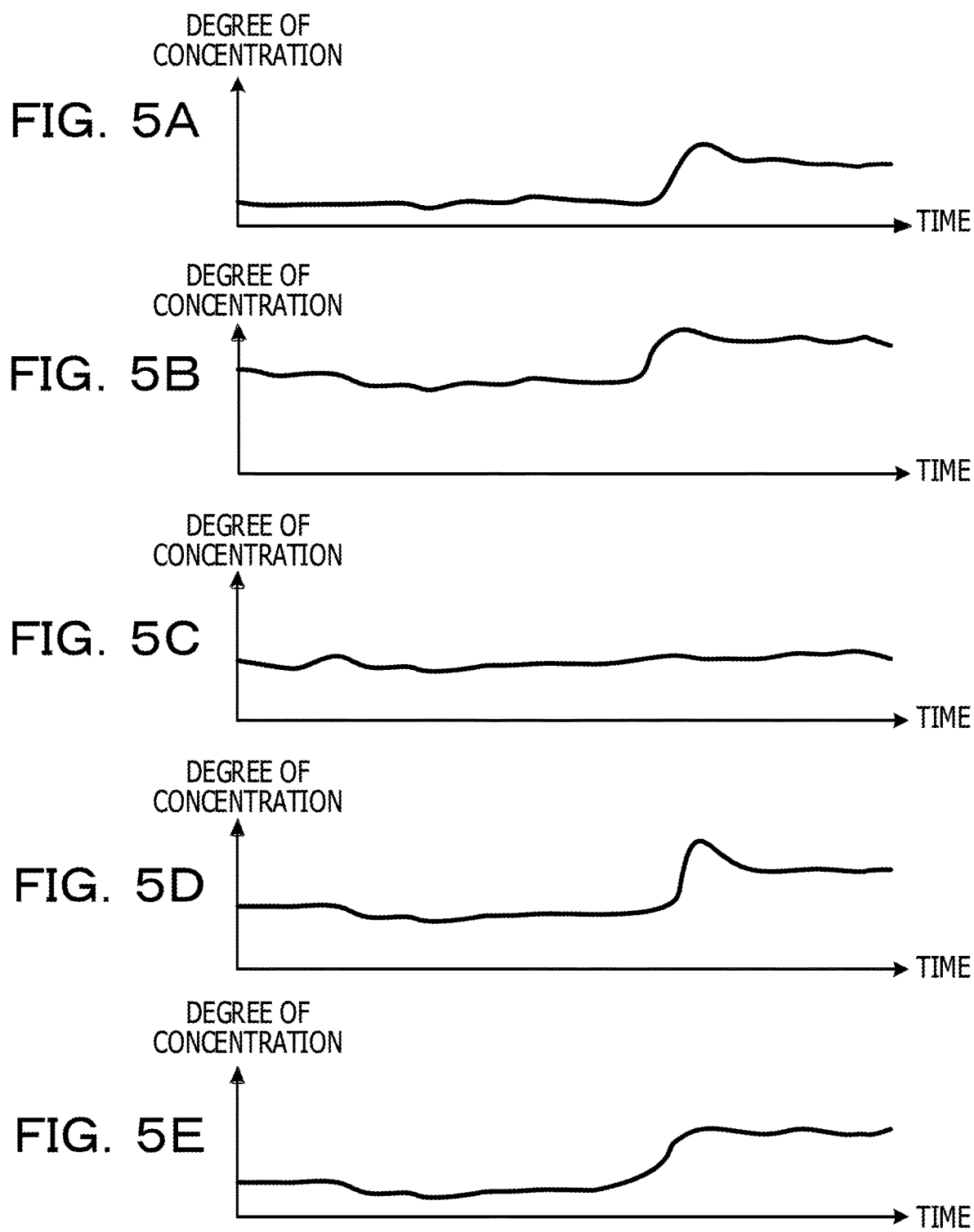

RECORDING MEDIUM ON WHICH USER ASSISTANCE PROGRAM IS RECORDED, INFORMATION PROCESSING DEVICE, AND USER ASSISTANCE METHOD

CROSS-REFERENCE TO RELATED APPLICATION

This application is based upon and claims the benefit of priority of the prior Japanese Patent Application No. 2018-76683, filed on Apr. 12, 2018, the entire contents of which are incorporated herein by reference.

FIELD

The embodiments discussed herein are related to a recording medium on which a user assistance program is recorded, an information processing device, and a user assistance method.

BACKGROUND

In a videoconferencing system, a plurality of users have a conference remotely via a network.

A related technology is disclosed in Japanese Laid-open Patent Publication No. 2010-141843.

SUMMARY

According to an aspect of the embodiments, a recording medium on which a user assistance program is recorded, the user assistance program making a computer perform: based on image information obtained by photographing a plurality of users who use a given service, calculating state quantities of the plurality of respective users corresponding to the image information; counting, for each time period, a number of users whose amounts of change in the calculated respective state quantities are equal to or more than a given threshold value among the plurality of users; and detecting a time period in which the counted number of users satisfies a given condition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 5A to 5E are diagrams illustrating a concrete example of concentration degree information;

DESCRIPTION OF EMBODIMENTS

Figure 1:
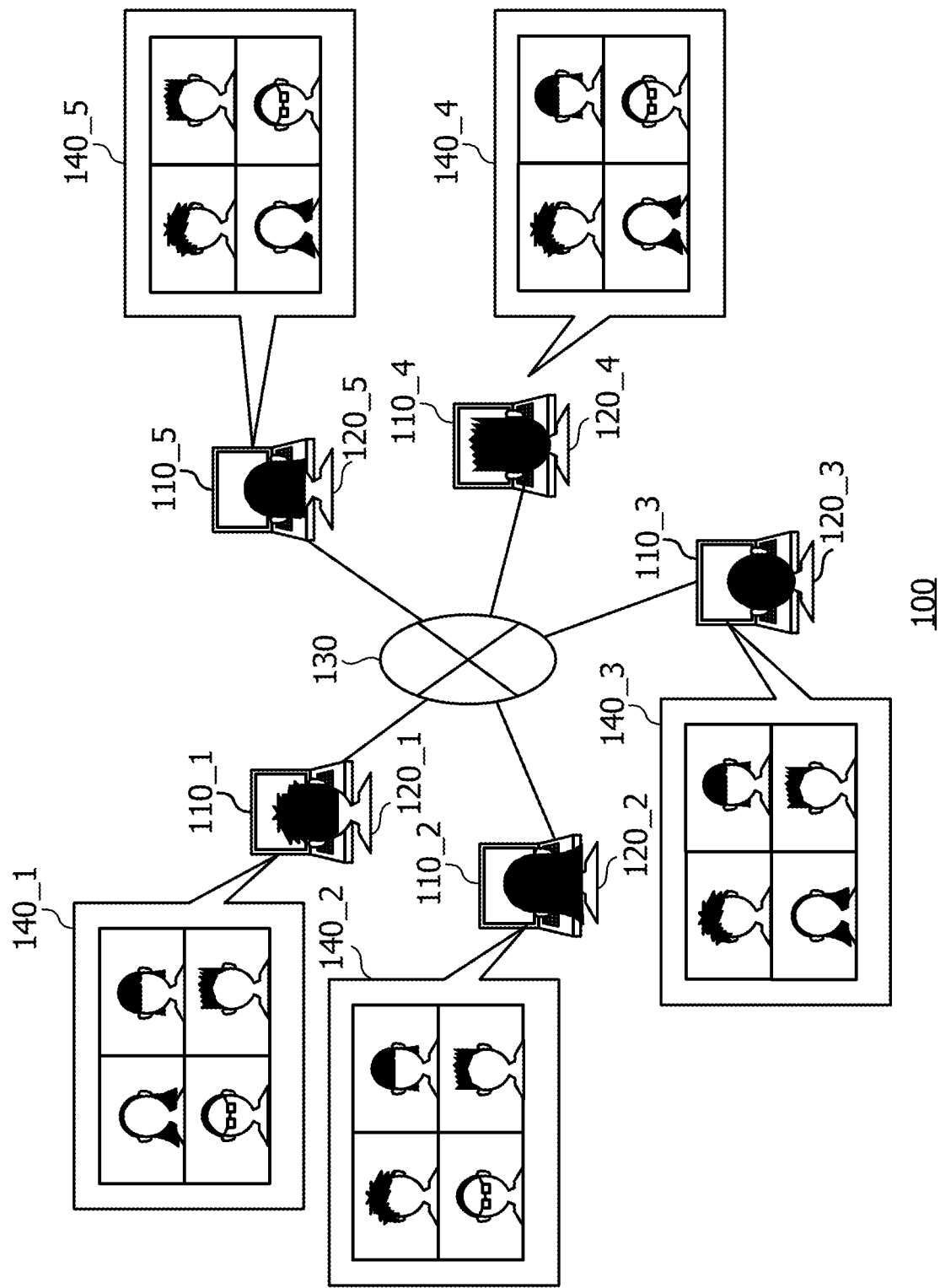
FIG. 1 is a diagram illustrating an example of a system configuration of a user assistance system.

For example, in the videoconferencing system, various user assistance functions for assisting each user (participant in a conference) using a conferencing service are proposed in addition to a function of providing the conferencing service.

For example, a user assistance function is proposed which measures each user using the conferencing service in the videoconferencing system, determines a degree of concentration of each user, and accordingly gives a stimulus to a user having a low degree of concentration.

For example, in the case of the user assistance function, users are desired to maintain a high degree of concentration at all times. On the other hand, it is difficult for each user to maintain a high degree of concentration at all times while using the conferencing service, and there is a time period in which a discussion not important for each user is made. It may therefore be more beneficial for each user to use a user assistance function that detects and notifies timing in which an important discussion is started (for example, timing in which the degree of concentration is to be increased).

For example, timing in which a user using a given service is to change a state quantity may be detected.

Embodiments will hereinafter be described with reference to the accompanying drawings. In the present specification and the drawings, constituent elements having essentially the same functional configurations are identified by the same reference numerals, and thereby repeated description thereof will be omitted.

[First Embodiment]
<System Configuration of User Assistance System>

A system configuration of a user assistance system will first be described. FIG. 1 is a diagram illustrating an example of a system configuration of a user assistance system. The example of FIG. 1 illustrates a state in which five information processing devices 110_1 to 110_5 are communicatably coupled to each other via a network 130, and users 120_1 to 120_5 are each using a videoconferencing service.

In a first embodiment, suppose that the information processing devices 110_1 to 110_5 have mutually identical functions, and are capable of mutually transmitting and receiving image information (including audio information). Therefore, as illustrated in FIG. 1, during the use of the videoconferencing service by the users 120_1 to 120_5, face images of other users are displayed on display screens 140_1 to 140_5 of the information processing devices 110_1 to 110_5.

For example, in the information processing device 110_1 of the user 120_1, the display screen 140_1 displays the face images of users (users 120_2 to 120_5) other than the user 120_1.

The user 120_1 may thereby conference while watching the faces of the remotely present users 120_2 to 120_5.

In addition, in the information processing device 110_2 of the user 120_2, the display screen 140_2 displays the face images of the users (users 120_1 and 120_3 to 120_5) other than the user 120_2.

The user 120_2 may thereby conference while watching the faces of the remotely present users 120_1 and 120_3 to 120_5. The same is true for the users 120_3, 120_4, and 120_5. In the following, a detailed explanation will be made of one information processing device of one user to simplify the description. For example, a detailed explanation will be made of the information processing device 110_3 that performs user assistance with the user 120_3 as an assistance target.

<Hardware Configuration of Information Processing Device>

Figure 2:
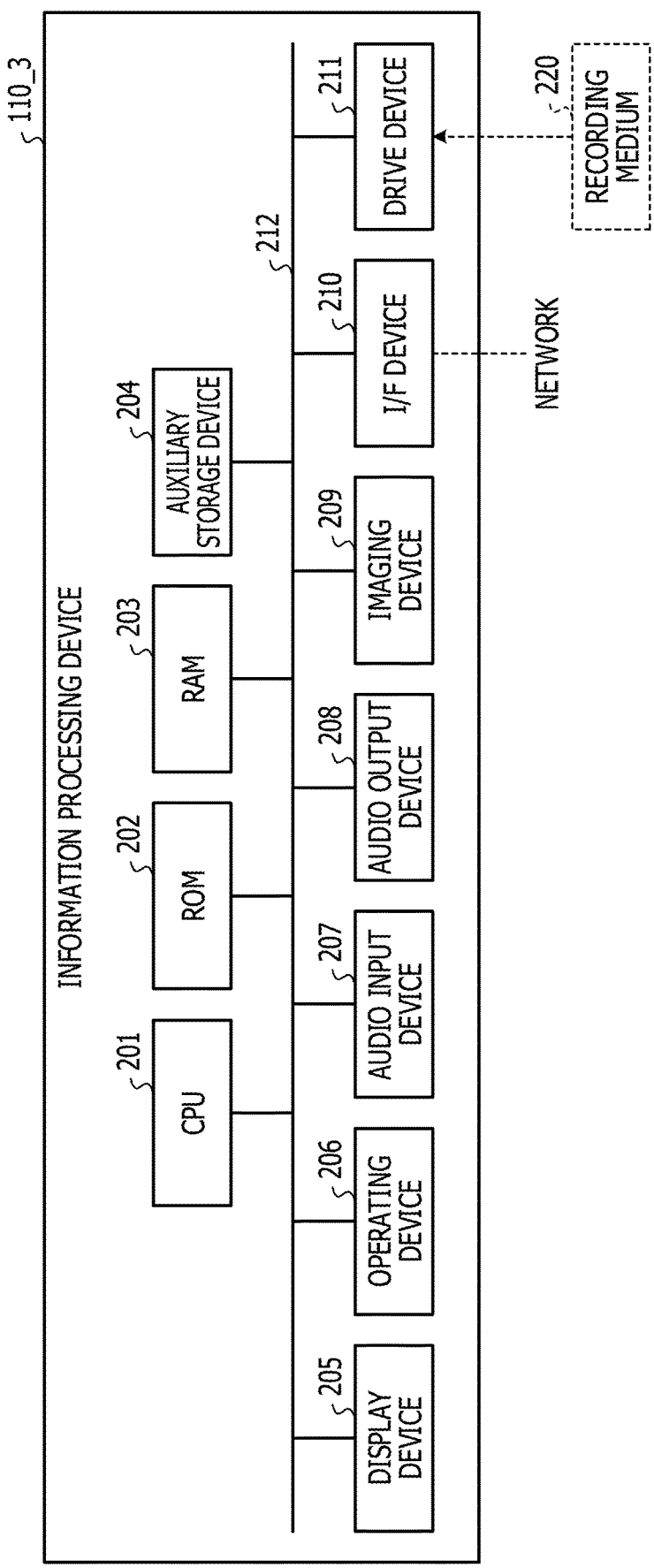
FIG. 2 is a diagram illustrating an example of a hardware configuration of an information processing device.
Figure 3:
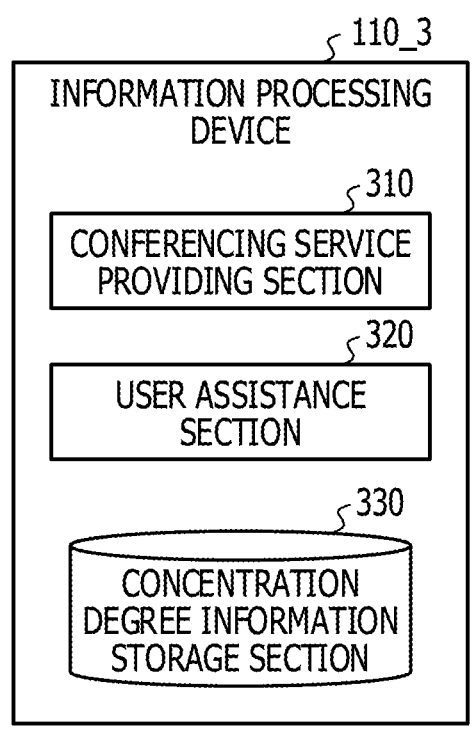
FIG. 3 is a diagram illustrating an example of a functional configuration of an information processing device.

FIG. 2 is a diagram illustrating an example of a hardware configuration of an information processing device. As illustrated in FIG. 2, the information processing device 110_3 includes a central processing unit (CPU) 201, a read only memory (ROM) 202, and a random access memory (RAM) 203. The CPU 201, the ROM 202, and the RAM 203 form a so-called computer.

The information processing device 110_3 also includes an auxiliary storage device 204, a display device 205, an operating device 206, an audio input device 207, an audio output device 208, an imaging device 209, an interface (I/F) device 210, and a drive device 211. The pieces of hardware of the information processing device 110_3 are intercoupled via a bus 212.

The CPU 201 is a computing device that executes various programs (for example, a conferencing service providing program, a user assistance program, and the like to be described later) installed in the auxiliary storage device 204.

The ROM 202 is a nonvolatile memory. The ROM 202 functions as a main storage device that stores various programs, data, and the like needed by the CPU 201 to execute the various programs installed in the auxiliary storage device 204. For example, the ROM 202 functions as a main storage device that stores a boot program such as a basic input/output system (BIOS), an extensible firmware interface (EFI), or the like.

The RAM 203 is a volatile memory such as a dynamic random access memory (DRAM), a static random access memory (SRAM), or the like. The RAM 203 functions as a main storage device that provides a work area in which the various programs installed in the auxiliary storage device 204 are expanded when executed by the CPU 201.

The auxiliary storage device 204 is an auxiliary storage device that stores the various programs and information obtained by executing the various programs. For example, a concentration degree information storage section to be described later is implemented in the auxiliary storage device 204.

The display device 205 is a display device that displays the face images of the other users 120_1, 120_2, 120_4, and 120_5 and the like. The operating device 206 is an input device for the user 120_3 of the information processing device 110_3 to input various instructions to the information processing device 110_3.

The audio input device 207 is a device that detects the voice of the user 120_3, and converts the voice of the user 120_3 into an audio signal. The audio input device 207 includes, for example, a microphone or the like. The audio output device 208 is a device that outputs the voices of the other users 120_1, 120_2, 120_4, and 120_5. The audio output device 208 includes, for example, a speaker or the like.

The imaging device 209 is an imaging device that photographs the user 120_3, and generates user image information. The I/F device 210 is a communication device for coupling to the network 130, and transmitting and receiving image information to and from the information processing devices 110_1, 110_2, 110_4, and 110_5 and the like.

The drive device 211 is a device for setting a recording medium 220. The recording medium 220 referred to here includes media on which information is recorded optically, electrically, or magnetically, such as a compact disc (CD)-ROM, a flexible disk, a magneto-optical disk, and the like. The recording medium 220 may also include a semiconductor memory or the like in which information is recorded electrically, such as a ROM, a flash memory, or the like.

The various programs installed in the auxiliary storage device 204 are, for example, installed by setting the distributed recording medium 220 in the drive device 211, and reading the various programs recorded on the recording medium 220 by the drive device 211. Alternatively, the various programs installed in the auxiliary storage device 204 may be installed by being downloaded from the network 130 via the I/F device 210.

<Functional Configuration of Information Processing Device>

Description will next be made of a functional configuration of an information processing device 110_3. As described above, a conferencing service providing program and a user assistance program are installed on the information processing device 110_3, and the information processing device 110_3 functions as a conferencing service providing section 310 and a user assistance section 320 when the programs are executed.

The conferencing service providing section 310 provides the videoconferencing service to the user 120_3 by transmitting and receiving image information to and from the information processing devices 110_1, 110_2, 110_4, and 110_5.

The user assistance section 320 has a user assistance function assisting the user 120_3 in the videoconferencing service provided by the conferencing service providing section 310.

For example, the user assistance section 320 obtains image information (user image information) of the user 120_3 photographed by the imaging device 209 from the conferencing service providing section 310. In addition, the user assistance section 320 obtains image information (other user image information) of the other users 120_1, 120_2, 120_4, and 120_5, the image information being received by the conferencing service providing section 310 from the information processing devices 110_1, 110_2, 110_4, and 110_5.

In addition, the user assistance section 320 calculates degrees of concentration as an example of state quantities of the respective users 120_1 to 120_5 based on the obtained image information (the user image information and the other user image information) of the respective users 120_1 to 120_5, and stores the degrees of concentration in a concentration degree information storage section 330.

In addition, the user assistance section 320 monitors temporal changes in the degrees of concentration of the respective users 120_1 to 120_5, and detects timing that satisfies a given condition. For example, the user assistance section 320 detects timing in which the degrees of concentration of a given proportion of users change in an increasing direction by a certain level. The user assistance section 320 may thereby detect timing in which an important discussion is started in the conference (for example, timing in which the user 120_3 is to increase the degree of concentration).

Further, the user assistance section 320 refers to the degree of concentration of the user 120_3 in the detected timing. When the user assistance section 320 determines that the degree of concentration of the user 120_3 is equal to or less than a given threshold value, the user assistance section 320 notifies the user 120_3 that an important discussion is started in the conference (for example, timing in which the user 120_3 is to increase the degree of concentration).

Thus, the user assistance section 320 may detect the timing in which an important discussion is started in the conference (timing in which the user 120_3 is to increase the degree of concentration), and notifies the user 120_3 of the timing. As a result, the user 120_3 may recognize that an important discussion is started in the conference.

<Details of Functional Configuration of User Assistance Section>

Figure 4:
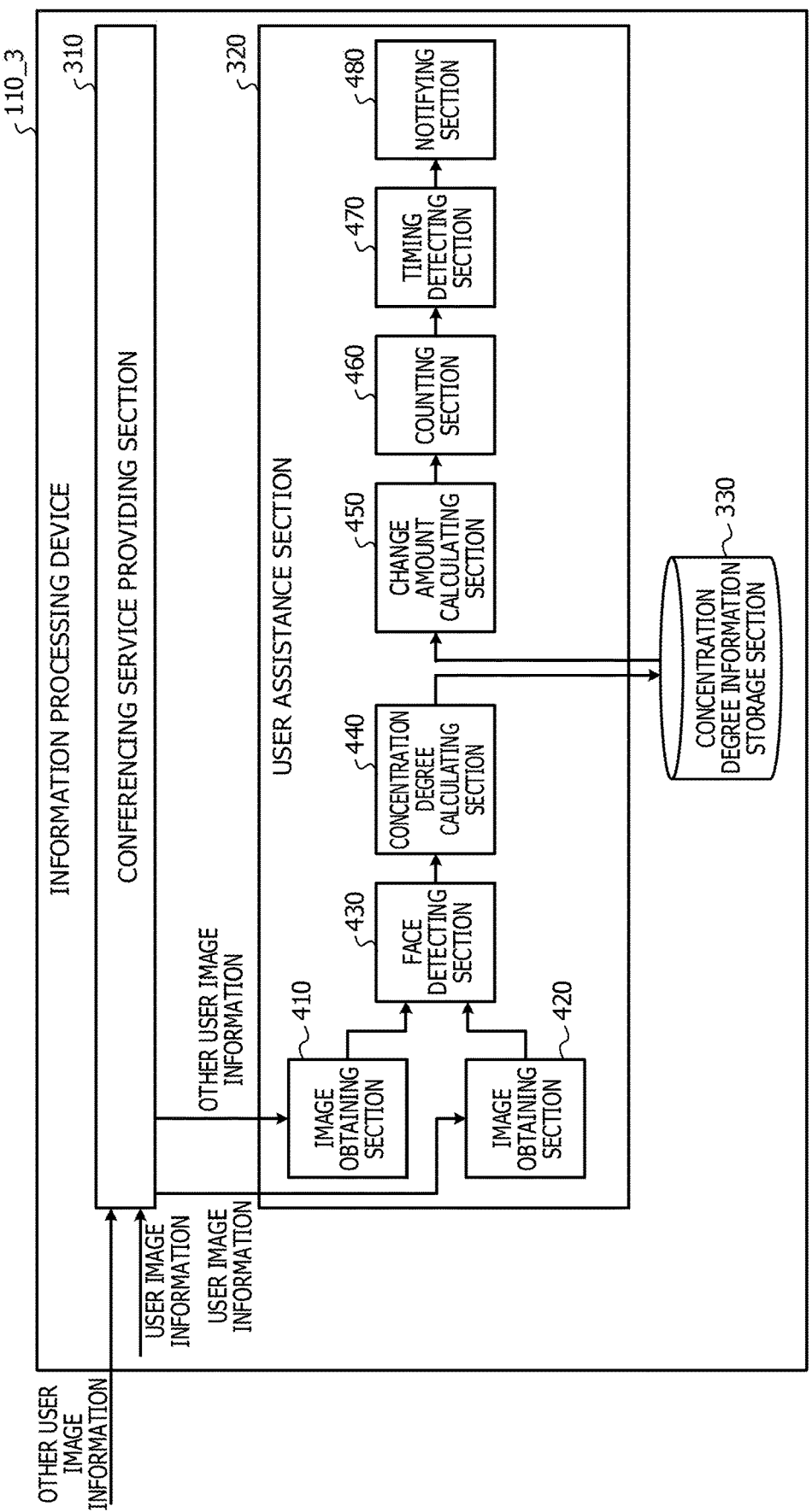
FIG. 4 is a first diagram illustrating details of a functional configuration of a user assistance section.

Description will next be made of details of a functional configuration of the user assistance section 320. FIG. 4 is a first diagram illustrating details of a functional configuration of a user assistance section. As illustrated in FIG. 4, the user assistance section 320 includes an image obtaining section 410, an image obtaining section 420, a face detecting section 430, and a concentration degree calculating section 440. The user assistance section 320 also includes a change amount calculating section 450, a counting section 460, a timing detecting section 470, and a notifying section 480.

The image obtaining section 410 obtains the image information of the users 120_1, 120_2, 120_4, and 120_5 as the other user image information from the conferencing service providing section 310. In addition, the image obtaining section 410 notifies the obtained other user image information to the face detecting section 430.

The image obtaining section 420 obtains the image information of the user 120_3 photographed by the imaging device 209 as the user image information from the conferencing service providing section 310. In addition, the image obtaining section 420 notifies the obtained user image information to the face detecting section 430.

The face detecting section 430 detects face regions from the other user image information notified from the image obtaining section 410, and notifies the face regions to the concentration degree calculating section 440. In addition, the face detecting section 430 detects a face region from the user image information notified from the image obtaining section 420, and notifies the face region to the concentration degree calculating section 440.

The concentration degree calculating section 440 is an example of a calculating section. The concentration degree calculating section 440 calculates the degrees of concentration of the users 120_1 to 120_5 by performing face expression analysis of the face regions notified from the face detecting section 430. In addition, the concentration degree calculating section 440 stores the calculated degrees of concentration of the users 120_1 to 120_5 as concentration degree information in the concentration degree information storage section 330.

FIGS. 5A to 5E are diagrams illustrating a concrete example of concentration degree information. As illustrated in FIGS. 5A to 5E, the concentration degree information is time series data indicating the degrees of concentration of the respective users at each time. Of the figures, FIG. 5A illustrates the degree of concentration of the user 120_1. In addition, FIG. 5B illustrates the degree of concentration of the user 120_2. Similarly, FIGS. 5C to 5E illustrate the degrees of concentration of the users 120_3 to 120_5, respectively.

The description returns to FIG. 4. The change amount calculating section 450 reads the concentration degree information stored in the concentration degree information storage section 330, performs temporal differentiation thereof, and thereby calculates amounts of change in the degrees of concentration of the respective users at each time. In addition, the change amount calculating section 450 notifies the counting section 460 of results of the calculation of the amounts of change in the degrees of concentration of the respective users 120_1 to 120_5 at each time.

The counting section 460 is an example of a counting section. The counting section 460 compares the results of the calculation of the amounts of change in the degrees of concentration of the respective users at each time, the results being notified from the change amount calculating section 450, with a given change threshold value, and thereby detects a time period in which the amounts of change in the degrees of concentration of respective users are equal to or more than the given change threshold value.

In addition, the counting section 460 counts the number of users whose amounts of change in the degrees of concentration in each time period are equal to or more than the given change threshold value, and notifies the timing detecting section 470 of a count result in each time period.

The timing detecting section 470 is an example of a detecting section. The timing detecting section 470 detects a time period in which a proportion of users whose amounts of change in the degrees of concentration are equal to or more than the given change threshold value among the users using the conferencing service (participants in the conference) is equal to or more than a given proportion threshold value from the count result in each time period. The timing detecting section 470 may thereby detect timing in which an important discussion is started in the conference (timing in which the user 120_3 is to increase the degree of concentration).

In addition, the timing detecting section 470 determines whether or not the degree of concentration of the user 120_3 in the detected time period is equal to or more than a given concentration degree threshold value (whether the state quantity of the user 120_3 is equal to or more than a given state quantity threshold value). Further, when determining that the degree of concentration of the user 120_3 is not equal to or more than the given concentration degree threshold value, the timing detecting section 470 makes a notification request to the notifying section 480. When determining that the degree of concentration of the user 120_3 is equal to or more than the given concentration degree threshold value, the timing detecting section 470 does not make the notification request to the notifying section 480.

When the notification request is made from the timing detecting section 470, the notifying section 480 notifies the user 120_3 that an important discussion is started.

The notifying section 480 does not notify the user 120_3 that an important discussion is started when the timing detecting section 470 determines that the degree of concentration of the user 120_3 is equal to or more than the given threshold value in the time period in which the notification request is made.

<Concrete Example of Processing of Sections of User Assistance Section>

Description will next be made of a concrete example of processing of the change amount calculating section 450, the counting section 460, the timing detecting section 470, and the notifying section 480 among the sections of the user assistance section.

(1) Concrete Example of Processing by Change Amount Calculating Section

Figure 6A:
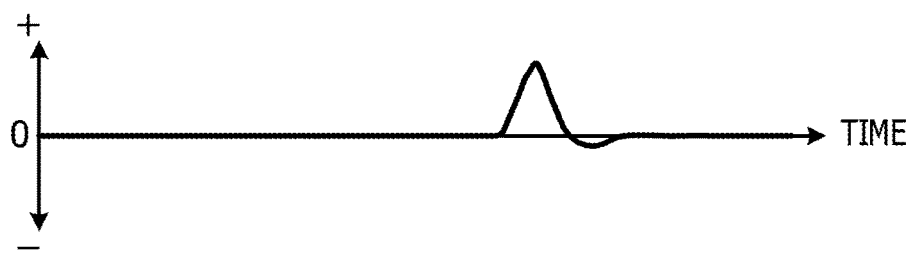
FIGS. 6A to 6E are diagrams illustrating a concrete example of processing by a change amount calculating section.

A concrete example of processing by the change amount calculating section 450 will first be described. FIGS. 6A to 6E are diagrams illustrating a concrete example of processing by a change amount calculating section. As described above, the change amount calculating section 450 reads the concentration degree information stored in the concentration degree information storage section 330, performs temporal differentiation thereof, and thereby calculates amounts of change in the degrees of concentration of the respective users at each time. FIG. 6A illustrates an amount of change in the degree of concentration of the user 120_1 at each time, the amount of change being calculated by performing the temporal differentiation of the degree of concentration of the user 120_1, the degree of concentration being illustrated in FIG. 5A.

Figure 6B:
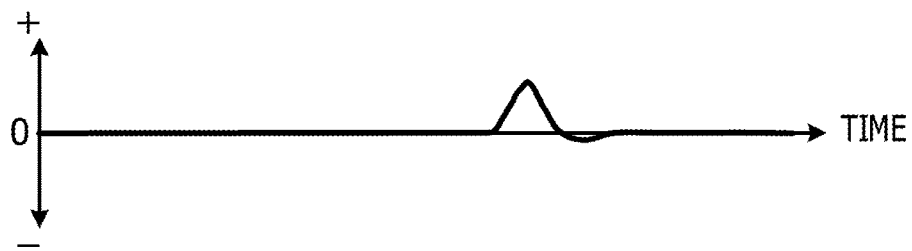
Figure 6C:
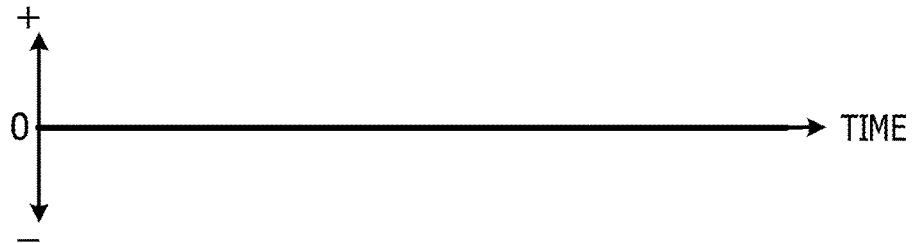
Figure 6D:
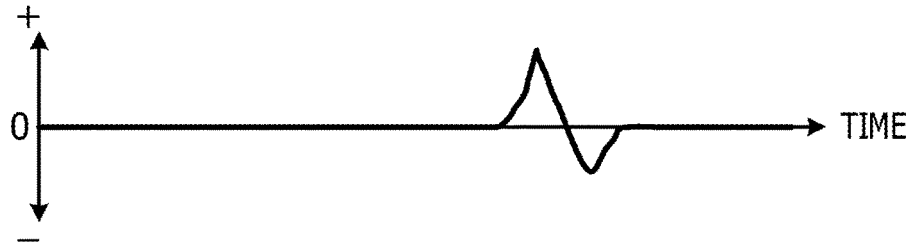
Figure 6E:
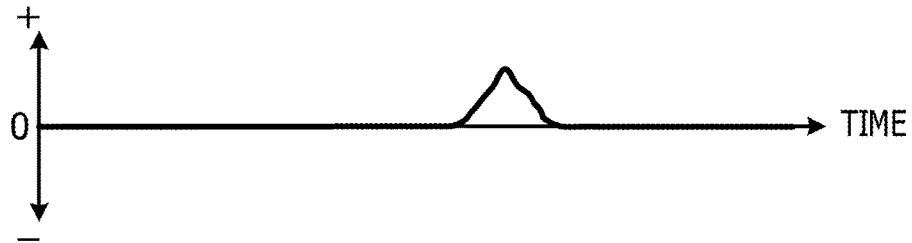

Similarly, FIG. 6B illustrates an amount of change in the degree of concentration of the user 120_2 at each time, the amount of change being calculated by performing the temporal differentiation of the degree of concentration of the user 120_2, the degree of concentration being illustrated in FIG. 5B. Similarly, FIGS. 6C to 6E illustrate amounts of change in the degrees of concentration of the users 120_3 to 120_5 at each time, the degrees of concentration being calculated by performing the temporal differentiation of each of the degrees of concentration of the users 120_3 to 120_5, the degrees of concentration being illustrated in FIGS. 5C to 5E.

(2) Concrete Example of Processing by Counting Section

Figure 7:
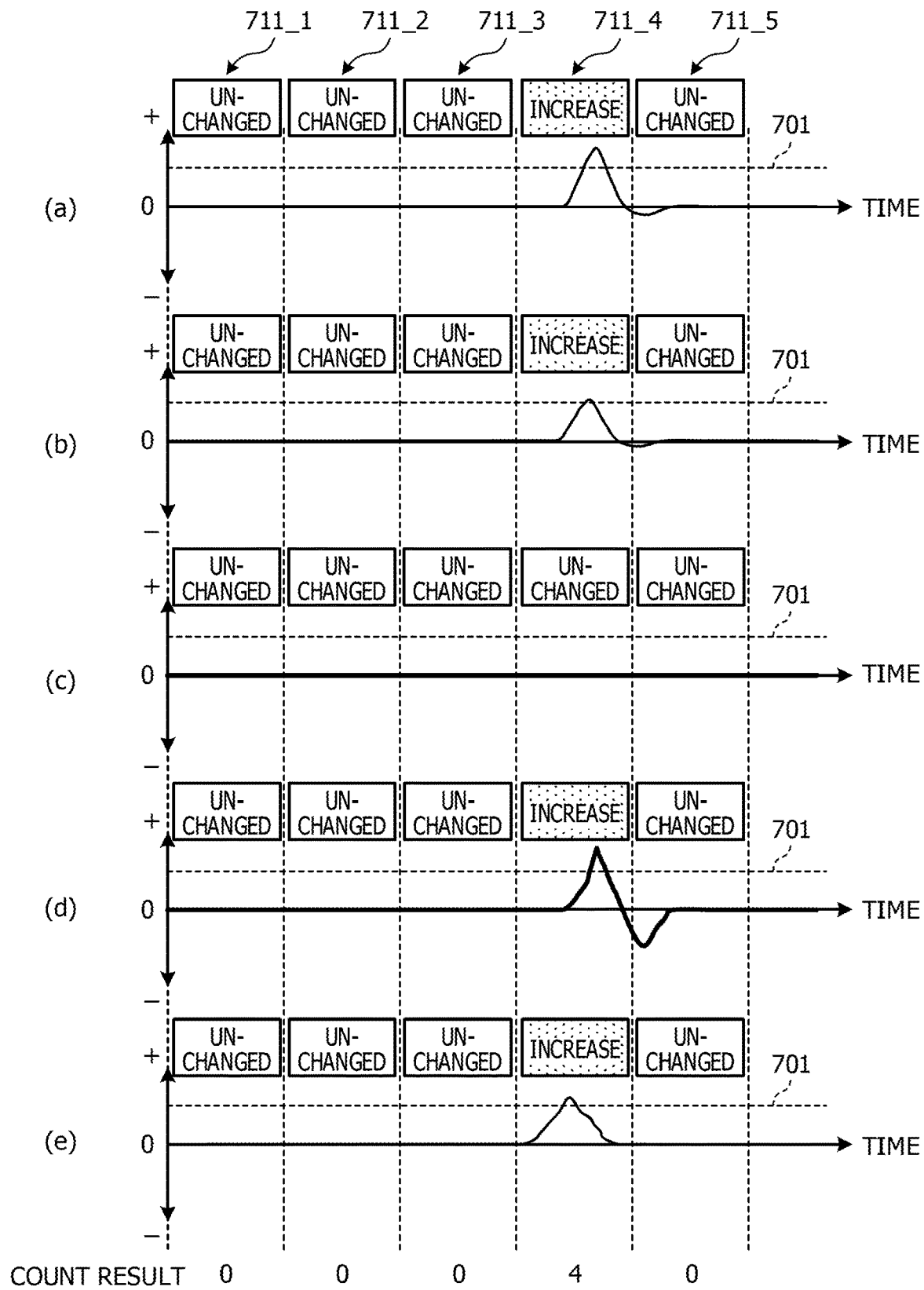
FIG. 7 is a first diagram illustrating a concrete example of processing by a counting section.

Description will next be made of a concrete example of processing by the counting section 460. FIG. 7 is a diagram illustrating a concrete example of processing by a counting section. As described above, the counting section 460 compares the results of the calculation of the amounts of change in the degrees of concentration of the respective users at each time with the given change threshold value, and thereby detects a time period in which amounts of change in the degrees of concentration of respective users are equal to or more than the given change threshold value.

In FIG. 7(*a*), a straight line 701 represents the given change threshold value. According to FIG. 7(*a*), in time periods 711_1 to 711_3 and 711_5, the result of the calculation of the amount of change in the degree of concentration of the user 120_1 is less than the given change threshold value. The counting section 460 therefore determines that the degree of concentration of the user 120_1 is not changed in the time periods 711_1 to 711_3 and 711_5. On the other hand, according to FIG. 7(*a*), a time period 711_4 includes a time at which the result of the calculation of the amount of change in the degree of concentration of the user 120_1 is equal to or more than the given change threshold value. The counting section 460 therefore determines that the degree of concentration of the user 120_1 is increased in the time period 711_4.

In addition, according to FIG. 7(*b*), in the time periods 711_1 to 711_3 and 711_5, the result of the calculation of the amount of change in the degree of concentration of the user 120_2 is less than the given change threshold value. The counting section 460 therefore determines that the degree of concentration of the user 120_2 is not changed in the time periods 711_1 to 711_3 and 711_5. On the other hand, according to FIG. 7(*b*), the time period 711_4 includes a time at which the result of the calculation of the amount of change in the degree of concentration of the user 120_2 is equal to or more than the given change threshold value. The counting section 460 therefore determines that the degree of concentration of the user 120_2 is increased in the time period 711_4.

Similarly, as illustrated in FIG. 7, the counting section 460 determines whether or not the degrees of concentration of the users 120_3 to 120_5 are increased in each of the time periods (711_1 to 711_5), and detects a time period in which the amounts of change in the degrees of concentration are equal to or more than the given change threshold value.

In addition, as illustrated in FIG. 7, the counting section 460 counts the number of users whose amounts of change in the degrees of concentration are equal to or more than the given change threshold value in each of the time periods. In the example of FIG. 7, the number of users whose amounts of change in the degrees of concentration are equal to or more than the given change threshold value is zero in the time periods 711_1 to 711_3 and 711_5. On the other hand, the number of users whose amounts of change in the degrees of concentration are equal to or more than the given change threshold value is four in the time period 711_4.

The counting section 460 notifies the timing detecting section 470 of the counted numbers of users as a count result in association with the time periods.

(3) Concrete Example of Processing by Timing Detecting Section

Figure 8:
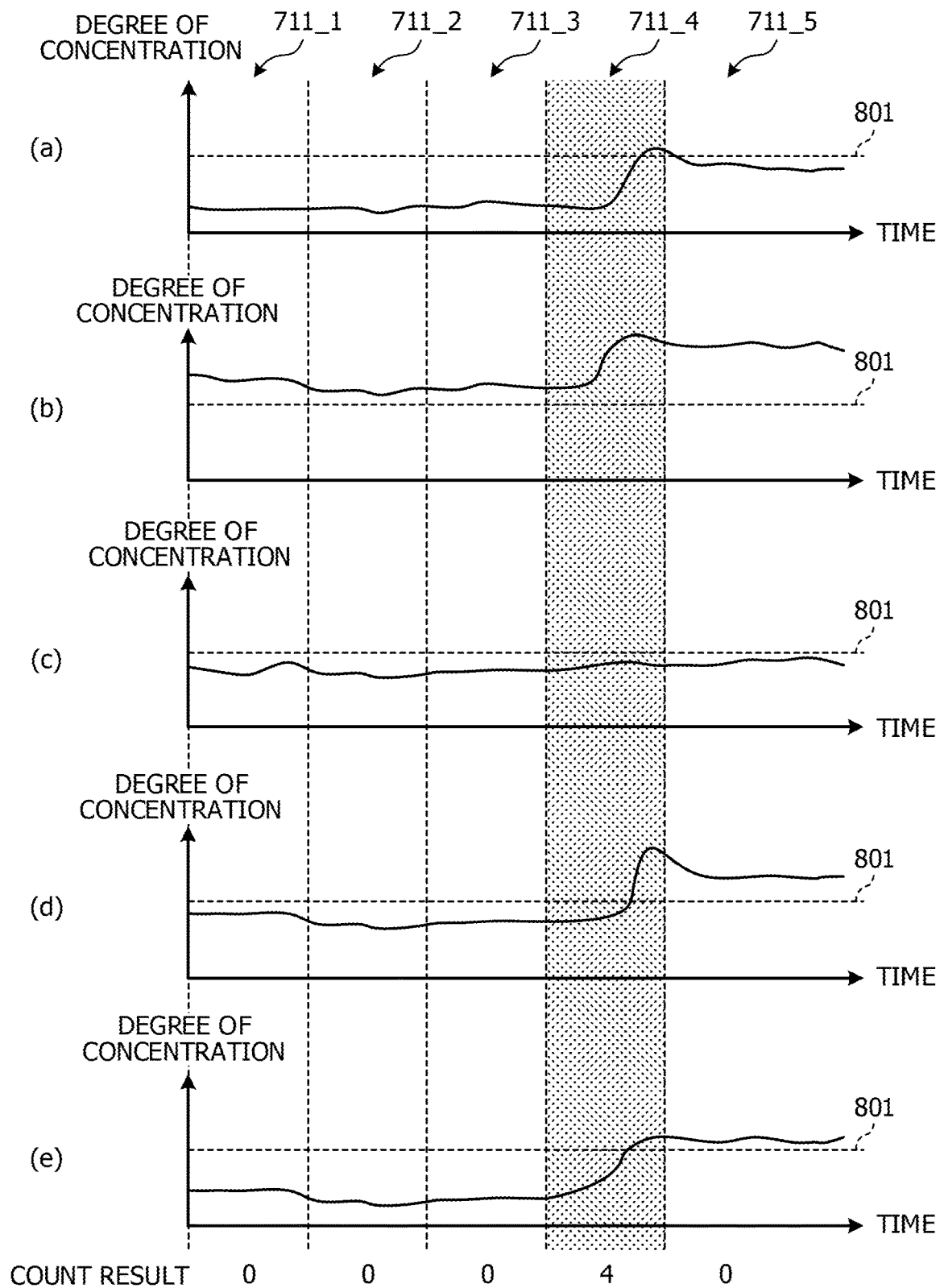
FIG. 8 is a diagram illustrating a concrete example of processing by a timing detecting section.

Description will next be made of a concrete example of processing by the timing detecting section 470. FIG. 8 is a diagram illustrating a concrete example of processing by a timing detecting section. As described above, the timing detecting section 470 detects a time period in which a proportion of users whose amounts of change in the degrees of concentration are equal to or more than the given change threshold value among the users using the conferencing service is equal to or more than the given proportion threshold value.

Here, supposing that the given proportion threshold value is "60%," because the number of users using the conferencing service is five, the timing detecting section 470 detects a time period in which the count result notified from the counting section 460 is equal to or more than three persons (=Five Persons×60%).

As illustrated in FIG. 8, the time period in which the count result is equal to or more than three persons is the time period 711_4. Hence, the timing detecting section 470 detects the time period 711_4 as a time period in which an important discussion is started in the conference (timing in which the user 120_3 is to increase the degree of concentration).

In addition, as described above, the timing detecting section 470 determines whether or not the degree of concentration of the user 120_3 is equal to or more than the given concentration degree threshold value in the detected time period. When determining that the degree of concentration of the user 120_3 is not equal to or more than the given concentration degree threshold value, the timing detecting section 470 makes a notification request to the notifying section 480.

In FIG. 8, a straight line 801 represents the given concentration degree threshold value. According to FIG. 8(*c*), in the time period 711_4, the degree of concentration of the user 120_3 is not equal to or more than the given concentration degree threshold value. Therefore, in the case of FIG. 8, the timing detecting section 470 makes a notification request to the notifying section 480 in the time period 711_4.

(4) Concrete Example of Processing by Notifying Section

Figure 9:
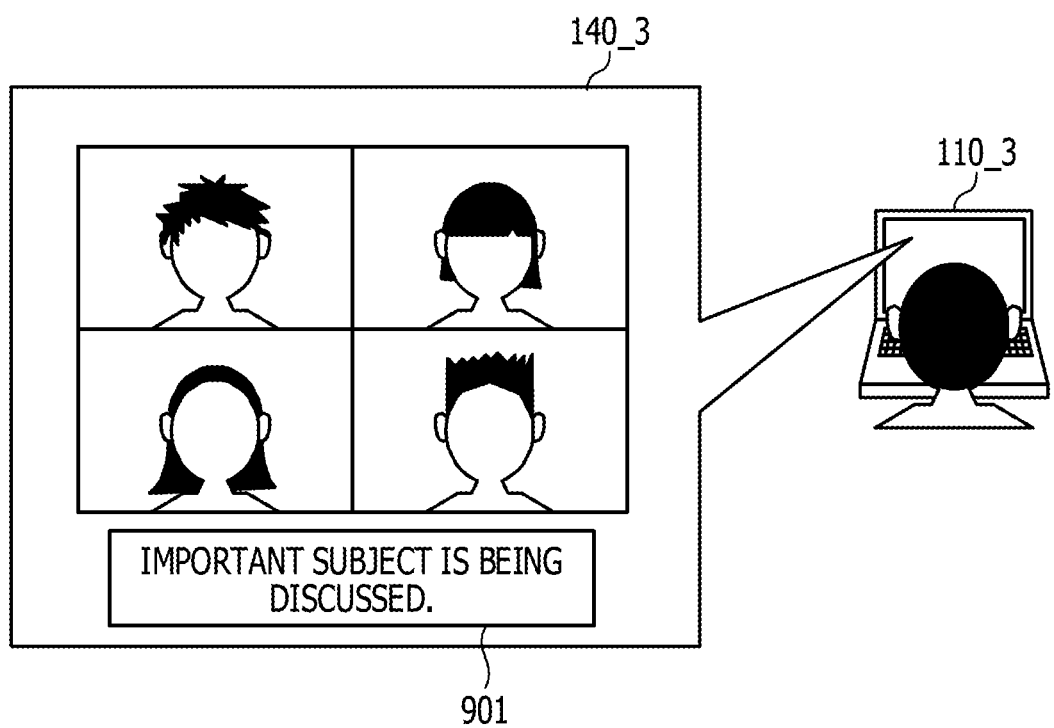
FIG. 9 is a diagram illustrating a concrete example of processing by a notifying section.

Description will next be made of a concrete example of processing by the notifying section 480. FIG. 9 is a diagram illustrating a concrete example of processing by a notifying section. As described above, when the notification request is made from the timing detecting section 470, the notifying section 480 notifies the user 120_3 that an important discussion is started. FIG. 9 illustrates an example in which a message 901 indicating that an important discussion is started is displayed as character information on the display screen 140_3.

The user 120_3 may thereby recognize that an important discussion is started.

<Flow of User Assistance Processing by User Assistance Section>

Figure 10:
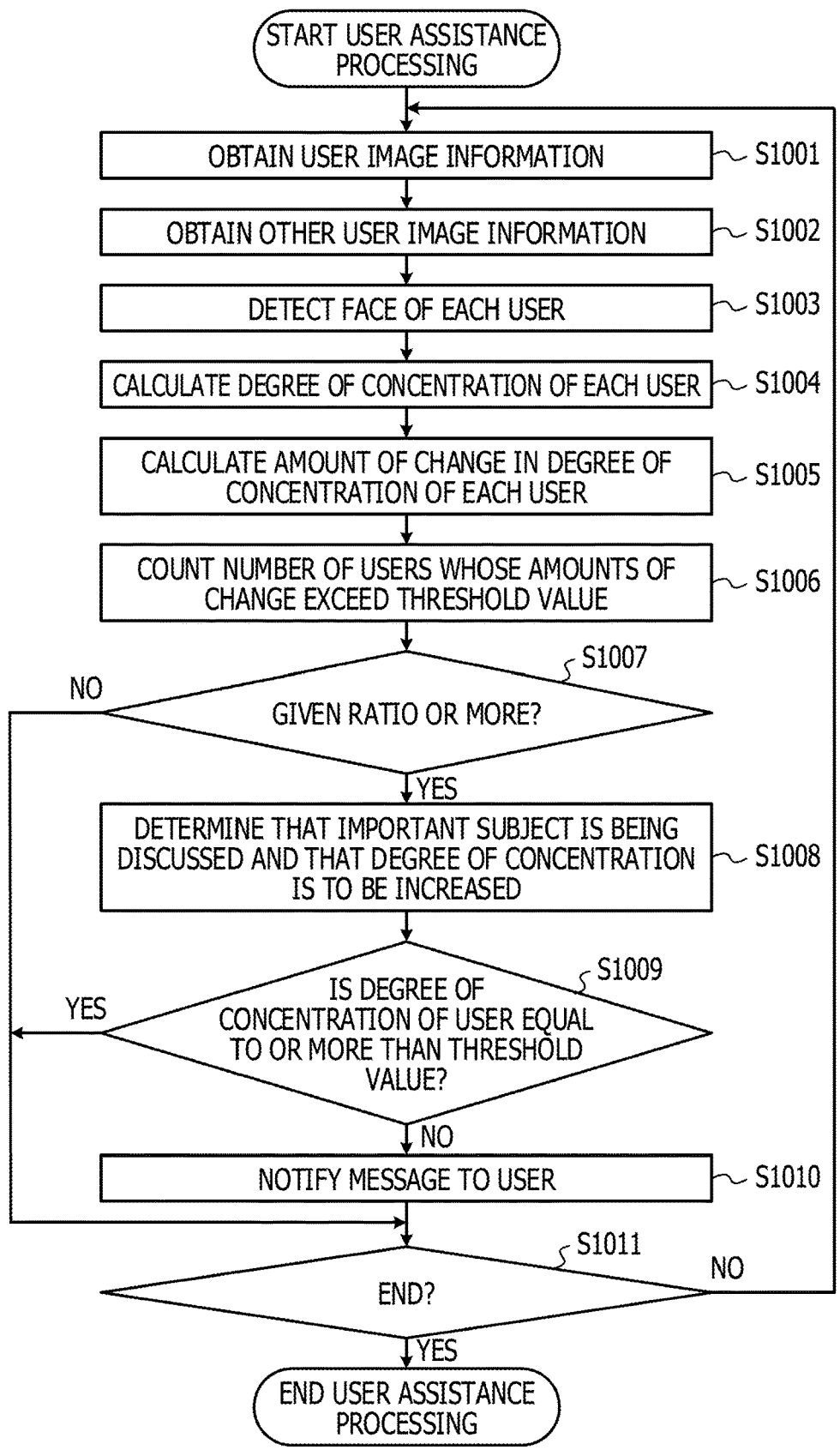
FIG. 10 is a first flowchart illustrating a flow of user assistance processing by a user assistance section.

Description will next be made of a flow of user assistance processing by the user assistance section 320. FIG. 10 is a first flowchart illustrating a flow of user assistance processing by a user assistance section. When the conferencing service providing section 310 is started, and the user 120_3 starts to use the conferencing service, the user assistance section 320 starts the user assistance processing illustrated in FIG. 10.

In step S1001, the image obtaining section 420 obtains user image information photographed by the imaging device 209 from the conferencing service providing section 310.

In step S1002, the image obtaining section 410 obtains other user image information transmitted from the information processing devices 110_1, 110_2, 110_4, and 110_5 from the conferencing service providing section 310.

In step S1003, the face detecting section 430 detects the face region of the user 120_3 from the user image information. In addition, the face detecting section 430 detects the face regions of the users 120_1, 120_2, 120_4, and 120_5 from the other user image information.

In step S1004, the concentration degree calculating section 440 calculates the degrees of concentration of the users 120_1 to 120_5 at each time based on the face regions of the users 120_1 to 120_5, the face regions being detected in the face detecting section 430, and stores the degrees of concentration of the users 120_1 to 120_5 at each time as concentration degree information in the concentration degree information storage section 330.

In step S1005, the change amount calculating section 450 reads the concentration degree information of the users 120_1 to 120_5, the concentration degree information being stored in the concentration degree information storage section 330, performs temporal differentiation thereof, and thereby calculates amounts of change in the degrees of concentration of the respective users at each time.

In step S1006, the counting section 460 compares results of the calculation of the amounts of change in the degrees of concentration of the respective users at each time with the given change threshold value, and thereby detects a time period in which the amounts of change in the degrees of concentration of respective users are equal to or more than the given change threshold value. Further, the counting section 460 counts the number of users whose amounts of change in the degrees of concentration are equal to or more than the given threshold value in each time period.

In step S1007, the timing detecting section 470 determines based on the count result whether or not a proportion of users whose amounts of change in the degrees of concentration are equal to or more than the given change threshold value is equal to or more than the given proportion threshold value.

When the timing detecting section 470 determines in step S1007 that the proportion of the users whose amounts of change in the degrees of concentration are equal to or more than the given change threshold value is equal to or more than the given proportion threshold value (in a case of Yes in step S1007), the processing proceeds to step S1008. In step S1008, the timing detecting section 470 determines that an important discussion is started in the conference (the user 120_3 is to increase the degree of concentration). The timing detecting section 470 may thereby detect timing in which an important discussion is started in the conference (timing in which the user 120_3 is to increase the degree of concentration).

In step S1009, the timing detecting section 470 determines whether or not the present degree of concentration of the user 120_3 is equal to or more than the given concentration degree threshold value. When the timing detecting section 470 determines that the present degree of concentration of the user 120_3 is not equal to or more than the given concentration degree threshold value in step S1009 (in a case of No in step S1009), the processing proceeds to step S1010.

In step S1010, the notifying section 480 notifies the user 120_3 by a message that an important discussion is started. The processing then proceeds to step S1011.

When the timing detecting section 470 determines in step S1007 that the proportion of the users whose amounts of change in the degrees of concentration are equal to or more than the given change threshold value is not equal to or more than the given proportion threshold value (in a case of No in step S1007), on the other hand, the processing proceeds directly to step S1011.

In step S1011, the image obtaining section 420 determines whether or not to end the user assistance processing. When it is determined in step S1011 that the user assistance processing is to be continued (in a case of No in step S1011), the processing returns to step S1001.

When it is determined in step S1011 that the user assistance processing is to be ended (in a case of Yes in step S1011), on the other hand, the user assistance processing is ended.

As is clear from the above description, the user assistance system 100 according to the first embodiment calculates the degrees of concentration of the respective users based on the user image information and the other user image information, and further calculates amounts of change in the calculated degrees of concentration of the respective users. In addition, the user assistance system 100 according to the first embodiment counts the number of users whose calculated amounts of change are equal to or more than the given change threshold value in each time period, and detects a time period in which the counted number of users is equal to or more than the given proportion threshold value. Further, when the degree of concentration of a user is not equal to or more than the given concentration degree threshold value in the detected time period, the user assistance system 100 according to the first embodiment gives a notification to the user.

Thus, according to the user assistance system 100 in accordance with the first embodiment, it is possible to detect timing in which an important discussion is started in the conference (timing in which the user is to increase the degree of concentration). Further, according to the user assistance system 100 in accordance with the first embodiment, the user may be notified when the degree of concentration of the user is not increased in the time period in which an important discussion is started (in the timing in which the user is to increase the degree of concentration). As a result, according to the user assistance system 100 in accordance with the first embodiment, the user using the videoconferencing service may recognize the timing in which to increase the degree of concentration (to change the state quantity).

[Second Embodiment]

In the foregoing first embodiment, description has been made supposing that the counting section 460 counts the number of users whose amounts of change in the degrees of concentration are equal to or more than the given threshold value in each time period, and notifies the count result in each time period to the timing detecting section 470. In a second embodiment, on the other hand, when the counting section counts the number of users, weighted addition is performed using a weighting factor preset for each user. Thus, it may be determined that an important discussion is started (timing in which a user is to increase the degree of concentration) when the degree of concentration of a particular user is increased.

As a result, by increasing the weighting factor of another user having a similar interest or concern, for example, the user may recognize timing in which a discussion of high interest or concern is started. The following description will be made of the second embodiment, centering on differences from the foregoing first embodiment.

<Details of Functional Configuration of User Assistance Section>

Figure 11:
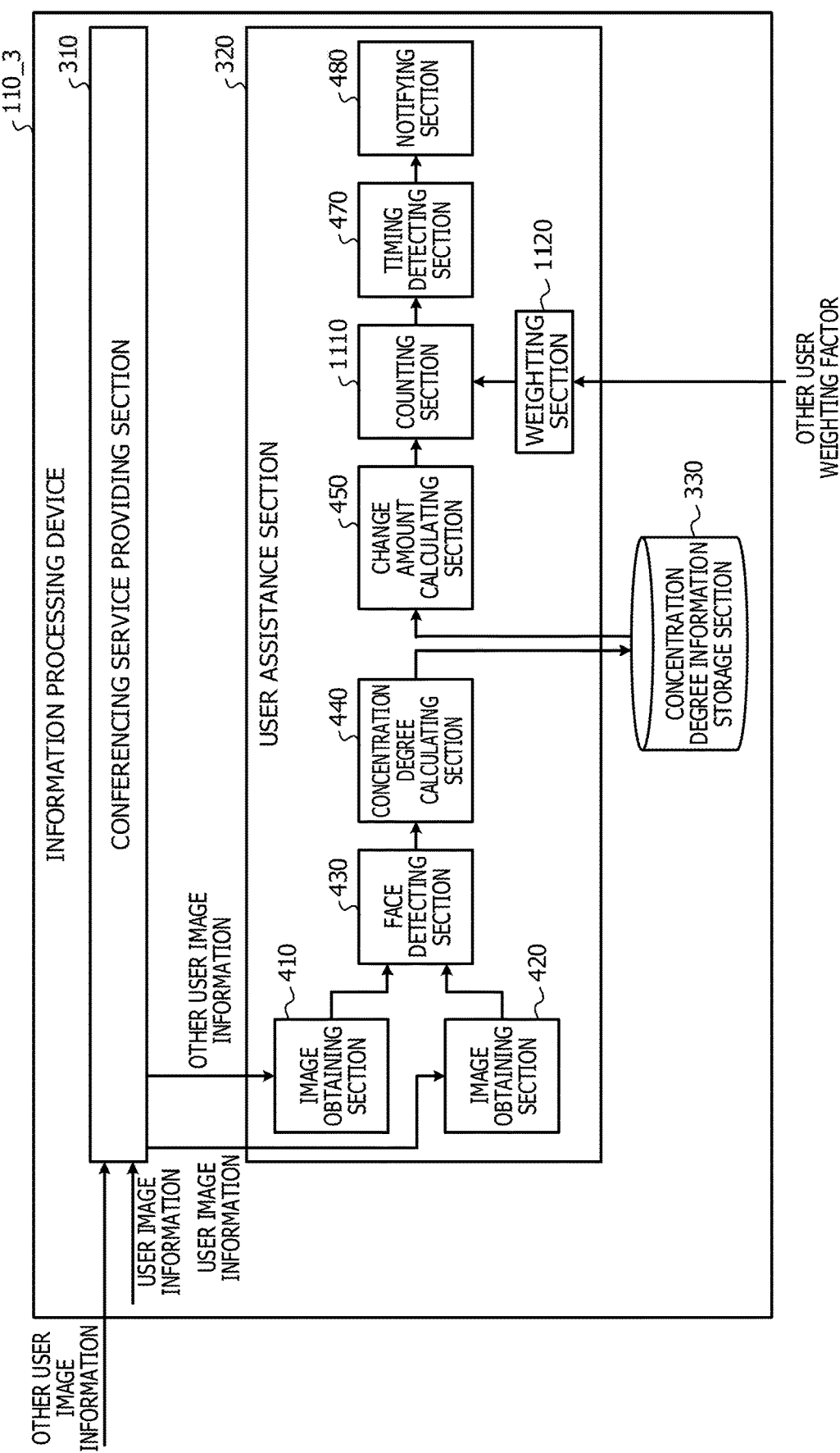
FIG. 11 is a second diagram illustrating an example of a functional configuration of a user assistance section.

FIG. 11 is a second diagram illustrating details of a functional configuration of a user assistance section. The differences from the functional configuration described with reference to FIG. 4 in the foregoing first embodiment are a counting section 1110 and a weighting section 1120.

The counting section 1110 compares results of calculation of amounts of change in degrees of concentration at each time, the results being notified from the change amount calculating section 450, with the given change threshold value, and thereby detects a time period in which the amounts of change in degrees of concentration are equal to or more than the given change threshold value.

In addition, the counting section 1110 counts the number of users whose amounts of change in the degrees of concentration are equal to or more than the given change threshold value in each time period by performing weighted addition using weighting factors notified from the weighting section 1120, and notifies the count result in each time period to the timing detecting section 470.

When the user 120_3 inputs a weighting factor for at least one of the users 120_1, 120_2, 120_4, and 120_5, the weighting section 1120 receives the weighting factor. In addition, the weighting section 1120 notifies the weighting factors of the users 120_1 to 120_5 to the counting section 1110. Suppose that the weighting section 1120 retains "1.0" as a default value for the weighting factors of the users 120_1 to 120_5.

<Concrete Example of Processing of Sections of User Assistance Section>

Description will next be made of a concrete example of processing of the weighting section 1120 and the counting section 1110 among the sections of the user assistance section.

(1) Concrete Example of Processing by Weighting Section

Figure 12:
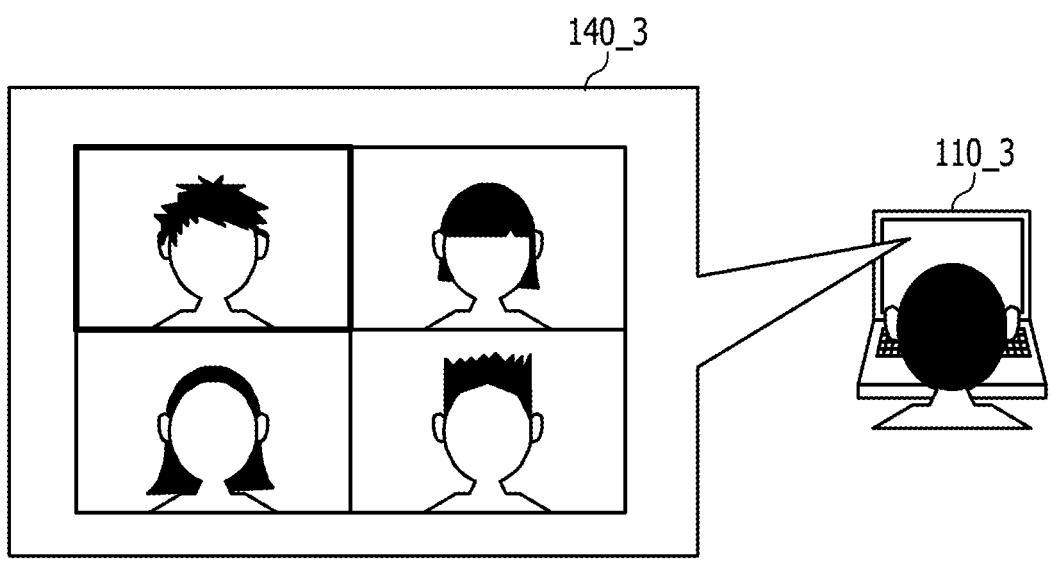
FIG. 12 is a diagram illustrating a concrete example of processing by a weighting section.

Description will first be made of a concrete example of processing by the weighting section 1120. FIG. 12 is a diagram illustrating a concrete example of processing by a weighting section. As illustrated in FIG. 12, the display screen 140_3 of the information processing device 110_3 displays face images of the users 120_1, 120_2, 120_4, and 120_5 using the conferencing service.

Accordingly, the user 120_3 specifies the face images of the users 120_1, 120_2, 120_4, and 120_5, the face images being displayed on the display screen 140_3, and inputs weighting factors. The weighting section 1120 may thereby notify the weighting factors of the users 120_1 to 120_5 to the counting section 1110.

(2) Concrete Example of Processing by Counting Section

Figure 13:
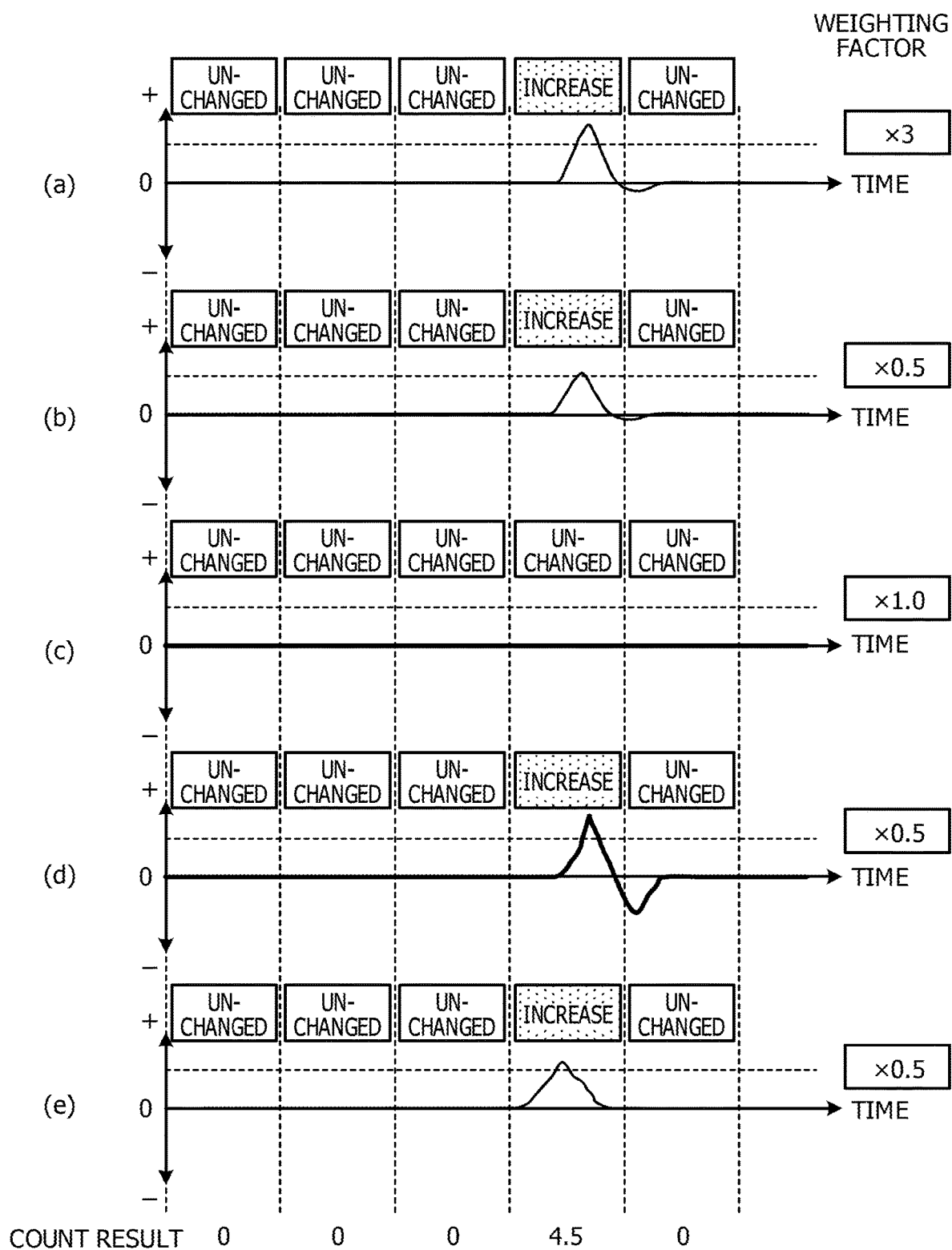
FIG. 13 is a second diagram illustrating a concrete example of processing by a counting section.

Description will next be made of a concrete example of processing by the counting section 1110. FIG. 13 is a diagram illustrating a concrete example of processing by a counting section. The example of FIG. 13 represents a state in which the weighting section 1120 notifies "3" as the weighting factor of the user 120_1, notifies "0.5" as the weighting factors of the users 120_2, 120_4, and 120_5, and notifies "1.0" as the weighting factor of the user 120_3.

As described above, the counting section 1110 counts the number of users whose amounts of change in the degrees of concentration are equal to or more than the given threshold value in each time period by performing weighted addition using the weighting factors notified from the weighting section 1120.

For example, the number of users whose amounts of change in the degrees of concentration are equal to or more than the given change threshold value is four in the time period 711_4. The weighting factor of the user 120_1 among the users is "3," and the weighting factors of the users 120_2, 120_4, and 120_5 are "0.5." A count result obtained by performing the weighted addition is therefore Count Result=1×3+1×0.5+1×0.5+1×0.5=4.5 Persons.

On the other hand, the number of users whose amounts of change in the degrees of concentration are equal to or more than the given change threshold value is zero in the time periods 711_1 to 711_3 and 711_5. Thus, irrespective of the weighting factors, count results are zero persons.

<Flow of User Assistance Processing by User Assistance Section>

Figure 14:
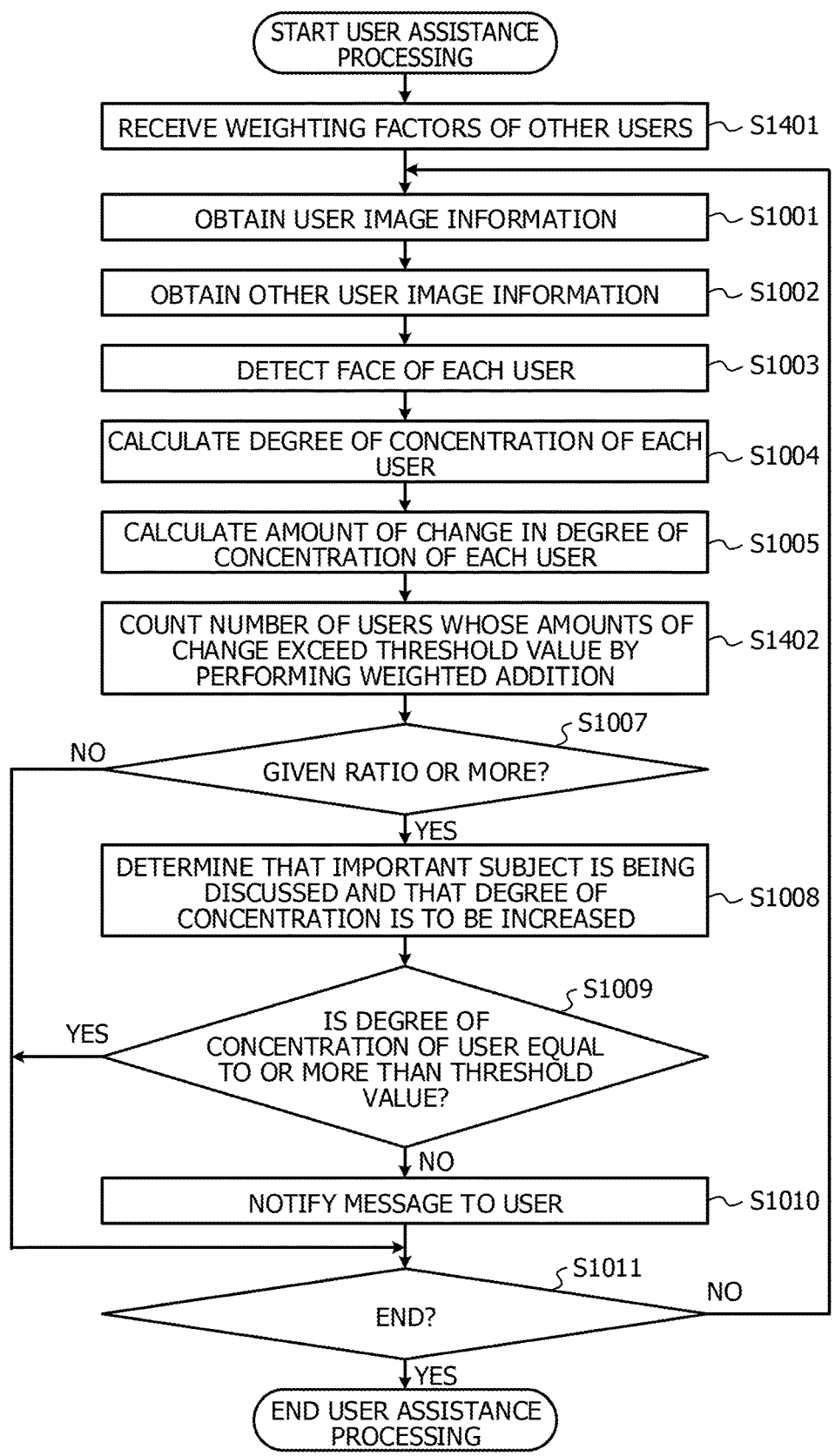
FIG. 14 is a second flowchart illustrating a flow of user assistance processing by a user assistance section.

Description will next be made of a flow of user assistance processing by the user assistance section 320. FIG. 14 is a second flowchart illustrating a flow of user assistance processing by a user assistance section. Differences from the flowchart described with reference to FIG. 10 in the foregoing first embodiment are steps S1401 and S1402.

In step S1401, the weighting section 1120 receives weighting factors input for respective other users (users 120_1, 120_2, 120_4, and 120_5) from the user 120_3.

In step S1402, the counting section 1110 counts the number of users whose amounts of change in the degrees of concentration are equal to or more than the given change threshold value by performing weighted addition using the weighting factors, and notifies a count result to the timing detecting section 470.

As is clear from the above description, in the user assistance system 100 according to the second embodiment, weighted addition is performed using a weighting factor preset for each user when the counting section counts the number of users.

Thus, according to the user assistance system 100 in accordance with the second embodiment, it may be determined that an important discussion is started when the degree of concentration of a particular user is increased.

As a result, according to the user assistance system 100 in accordance with the second embodiment, a user, for example, increases the weighting factor of another user having similar interest or concern, and may thereby recognize timing in which a discussion of high interest or concern is started.

[Other Embodiments]

In the foregoing first and second embodiments, description has been made supposing that the information processing devices 110_1 to 110_5 coupled to the network 130 each include the user assistance section 320. However, the user assistance section 320 may be possessed by one of the information processing devices 110_1 to 110_5. Alternatively, an information processing device may be separately provided in addition to the information processing devices 110_1 to 110_5, and the information processing device may include the user assistance section 320.

However, in the case where the one information processing device includes the user assistance section 320, when the timing detecting section 470 detects timing in which an important discussion is started in the conference, the timing detecting section 470 determines whether the degree of concentration of each of the users 120_1 to 120_5 is equal to or more than the given concentration degree threshold value. In addition, the notifying section 480 notifies all users whose degrees of concentration are decided not to be equal to or more than the given concentration degree threshold value that an important discussion is started.

In the case where the one information processing device includes the user assistance section 320, service as a target of application of the user assistance section 320 is not limited to the videoconferencing service as in the foregoing first and second embodiments. The user assistance section 320 may be applied to arbitrary services such as a remote lecture service in which a particular user gives a lecture to other users in one direction. However, suppose that in the case where the particular user gives a lecture to the other users in one direction, the change amount calculating section 450 calculates amounts of change in the degrees of concentration of the other users excluding the particular user.

In addition, in the foregoing first and second embodiments, description has been made supposing that one information processing device corresponds to one user. However, one information processing device may correspond to a plurality of users.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium on which a user assistance program is recorded, the user assistance program making a computer perform:
based on image information obtained by photographing a plurality of users who use a given service, calculating state quantities of the plurality of respective users corresponding to the image information;
counting, for each time period, a number of users whose amounts of change in the calculated respective state quantities are equal to or more than a given threshold value among the plurality of users; and
detecting a time period in which the counted number of users satisfies a given condition,
wherein the amounts of change in the state quantities are calculated by temporal differentiation of the calculated state quantities of the respective plurality of users.

2. The non-transitory computer-readable recording medium according to claim 1, wherein
when the state quantity of a user as a target of assistance is decided not to be equal to or more than a given state quantity threshold value in the time period in which the given condition is satisfied, a message is notified to the user as the target of assistance.

3. The non-transitory computer-readable recording medium according to claim 1, wherein
when the state quantity of one of the plurality of users in the time period in which the given condition is satisfied is decided not to be equal to or more than a given state quantity threshold value, a message is notified to the decided user.

4. The non-transitory computer-readable recording medium according to claim 1, wherein
input of a weighting factor is received for at least one of the plurality of users, and the number of users whose amounts of change in the calculated state quantities are equal to or more than the given threshold value is counted by performing weighted addition using the weighting factor.

5. An information processing device comprising:
a memory; and
a processor coupled to the memory and configured to:
calculate, based on image information obtained by photographing a plurality of users who use a given service, state quantities of the plurality of respective users corresponding to the image information;
count, for each time period, a number of users whose amounts of change in the calculated respective state quantities are equal to or more than a given threshold value among the plurality of users; and
detect a time period in which the counted number of users satisfies a given condition,
wherein the amounts of change in the state quantities are calculated by temporal differentiation of the calculated state quantities of the respective plurality of users.

6. The information processing device according to claim 5, wherein
when the state quantity of a user as a target of assistance is decided not to be equal to or more than a given state quantity threshold value in the time period in which the given condition is satisfied, a message is notified to the user as the target of assistance.

7. The information processing device according to claim 5, wherein when the state quantity of one of the plurality of users in the time period in which the given condition is satisfied is decided not to be equal to or more than a given state quantity threshold value, a message is notified to the decided user.

8. The information processing device according to claim 5, wherein input of a weighting factor is received for at least one of the plurality of users, and the number of users whose amounts of change in the calculated state quantities are equal to or more than the given threshold value is counted by performing weighted addition using the weighting factor.

9. A user assistance method comprising:
calculating, by a computer, based on image information obtained by photographing a plurality of users who use a given service, state quantities of the plurality of respective users corresponding to the image information;

counting, for each time period, a number of users whose amounts of change in the calculated respective state quantities are equal to or more than a given threshold value among the plurality of users; and detecting a time period in which the counted number of users satisfies a given condition, wherein the amounts of change in the state quantities are calculated by temporal differentiation of the calculated state quantities of the respective plurality of users.

10. The user assistance method according to claim 9, wherein when the state quantity of a user as a target of assistance is decided not to be equal to or more than a given state quantity threshold value in the time period in which the given condition is satisfied, a message is notified to the user as the target of assistance.

11. The user assistance method according to claim 9, wherein when the state quantity of one of the plurality of users in the time period in which the given condition is satisfied is decided not to be equal to or more than a given state quantity threshold value, a message is notified to the decided user.

12. The user assistance method according to claim 9, wherein input of a weighting factor is received for at least one of the plurality of users, and the number of users whose amounts of change in the calculated state quantities are equal to or more than the given threshold value is counted by performing weighted addition using the weighting factor.

* * * * *